United States Patent [19]

Takahashi et al.

[11] Patent Number: 5,411,323

[45] Date of Patent: May 2, 1995

[54] AUTOMATIC BRAKE CONTROL APPARATUS AND A BRAKE PRESSURE CONTROL VALVE

[75] Inventors: Norio Takahashi; Mitsuhiro Tsujita, both of Hyogo, Japan

[73] Assignee: Sumitomo Precision Products Co., Ltd., Amagasaki, Japan

[21] Appl. No.: 285,433

[22] Filed: Aug. 4, 1994

Related U.S. Application Data

[63] Continuation of Ser. No. 32,787, Mar. 17, 1993, abandoned.

[51] Int. Cl.⁶ .................. B60T 13/18; B60T 17/20
[52] U.S. Cl. .................. 303/20; 303/117.1; 303/119.2; 303/DIG. 4
[58] Field of Search ............. 303/15, 20, 117.1, 119.1, 303/119.2, DIG. 3, DIG. 4

[56] References Cited

U.S. PATENT DOCUMENTS

| | | | |
|---|---|---|---|
| 4,640,475 | 2/1987 | Zoerb | 303/117.1 X |
| 4,668,021 | 5/1987 | Cook | 303/117.1 |
| 4,685,748 | 8/1987 | Zoerb | 303/117.1 |
| 4,755,008 | 7/1988 | Imoto et al. | 303/DIG. 4 |
| 4,789,208 | 12/1988 | Kohno | 303/119.2 X |
| 5,236,256 | 8/1993 | Schmidt et al. | 303/DIG. 4 |

FOREIGN PATENT DOCUMENTS 2184961  8/1987  Japan ................. 303/119.2

Primary Examiner—Robert J. Oberleitner
Assistant Examiner—Alfred Muratori
Attorney, Agent, or Firm—Oblon, Spivak, McClelland, Maier & Neustadt

[57] ABSTRACT

An automatic brake control apparatus includes a pressure intensifying solenoid valve in a hydraulic brake line connecting a source of hydraulic pressure with a brake, as well as a pressure reducing solenoid valve in a relief line branched from the brake line and connected to a low pressure reservoir. A pressure sensor is positioned to sense a hydraulic pressure in the brake line at a position downstream of a point where the relief line branches from the brake line. A controller receives a signal from the pressure sensor and determines desired brake pressure for producing a desired speed reduction rate. The controller outputs control signals to the pressure intensifying solenoid valve and the pressure reducing solenoid valve such that the detected brake pressure corresponds to the desired brake pressure. The apparatus may be incorporated into a brake pressure control valve having first and second stages.

5 Claims, 5 Drawing Sheets

AUTOMATIC BRAKE CONTROL APPARATUS AND A BRAKE PRESSURE CONTROL VALVE

This application is a continuation of application Ser. No. 08/032,787, filed on Mar. 17, 1993, now abandoned.

BACKGROUND OF THE INVENTION

1. Field of the Invention

The present invention relates to an automatic brake control apparatus which is built-in a braking system for an airplane, vehicles or the like, and a brake pressure control valve suitably used therefor.

2. Description of the Related Art

A conventional automatic brake has been used mainly as a brake for the airplane. In FIG. 4, an automatic brake control apparatus for an airplane is shown. The control apparatus is provided with an electro-hydraulic servovalve 51, a pump 52 for feeding oil pressure thereto, and a controller 53 for outputting a control signal to the electro-hydraulic servovalve 51. The controller 53 is given a speed reduction rate selecting signal from a setting device 54 and the number of rotations of the wheels from a rotation number sensor 56 provided at a wheel 55. The number of rotations of the wheels is used for computing the speed reduction rate, but recently a G-sensor 58 may directly be used for the control input.

When the condition of road surface (a dry, wet or icy road surface) is selected by a switch or the like, a desired speed reduction rate corresponding to the condition is selected by the controller 53. When the automatic brake operates, a control signal is sent from the controller 53 to the electro-hydraulic servovalve 51 so that an actual speed reduction rate coincides with the desired rate, and the brake pressure is applied from the electro-hydraulic servovalve 51 to the brake 57 on the basis of the control signal.

The electro-hydraulic servovalve which is conventionally used for the automatic brake control apparatus is advantageous in that a response frequency is high, 100 HZ or more, and adjustment pressure almost proportional to an input current is obtainable, but has certain defects. For example, the conventional servovalve is high in manufacturing cost, does not withstand contamination caused by operating oil, is sensitive to magnetic fields because it is operated by a weak magnetic force of a torque motor unit, always requires operating oil, has high oil consumption and large hysteresis between the input current and the adjusting pressure.

The conventional automatic brake control apparatus, which directly compensates for various defects of the electrohydraulic servovalve is expensive to produce and low in durability. Also, the apparatus, when used as an emergency brake, continuously circulates the operating oil by use of a hydraulic pump. Therefore, the use of the automatic brake control apparatus has been limited to expensive systems such as large-scale passenger plane brake systems.

SUMMARY OF THE INVENTION

An object of the present invention is to provide an automatic brake control apparatus which is inexpensive to produce, small-sized, superior in durability, and useful for emergencies.

Another object of the present invention is to provide a brake pressure control valve which is small-sized and suitable for an automatic brake control apparatus with less oil consumption.

The automatic brake control apparatus of the present invention is provided with a pressure intensifying solenoid valve interposed in a brake line for connecting a pressure source and a brake. A pressure reducing solenoid valve is interposed in a relief line branching from the outlet side of the pressure intensifying solenoid valve. A pressure sensor is interposed in the brake line farther downstream than the branch point of the relief line. A controller is provided for computing brake pressure in order to obtain a desired speed reduction rate and for outputting control signals to the pressure intensifying solenoid valve and pressure reducing solenoid valve so that the brake pressure detected by the pressure sensor coincides with the desired brake pressure.

The brake pressure control valve of the present invention, comprises a first stage provided with a pressure intensifying solenoid valve for opening/closing between a passage B communicating with a control pressure feed port $P_S$ and a pressure reducing solenoid valve for opening/closing between a passage C communicating with a return pressure port $P_R$ and the passage B. The pressure intensifying solenoid valve and pressure reducing solenoid valve are disposed opposite to each other, and a pressure sensor is positioned at the end of the passage B. A second stage is provided with a spool interposed in the way of the passages A, B and C so as to open/close the respective passages A, B and C. The spool faces at one end thereof a chamber communicating through an orifice with a passage D branching from the passage A. The spool is biased at its other end face by a coil spring.

In the automatic brake control apparatus of the present invention, when the brake pressure is lower than the desired brake pressure computed by the controller, the pressure intensifying solenoid valve opens to directly apply pressure of the pressure source to the brake. When the brake pressure is higher than the desired brake pressure, the pressure reducing solenoid valve opens to lower the brake pressure. Thus, both the solenoid valves open/close and the brake pressure changes in a desired fashion.

In the brake pressure control valve of the present invention, pressure oil is fed to the passage A from the pressure source through the control pressure feed port $P_S$. When the pressure intensifying solenoid valve and pressure reducing solenoid valve are turned off, the pressure oil is fed to the chamber through the passage D to move the spool against a biasing force of the coil spring, thereby closing communication between the passages A and B to cut off communication between the control pressure feed port $P_S$ and the brake pressure port $P_B$. Thus, the pressure of brake pressure feed port $P_S$ is kept at a constant value depending on the biasing force of the coil spring, at which time no pressure oil flows, reducing oil consumption.

In this state, when the pressure intensifying solenoid valve is on, the passages A and B communicate with each other and the pressure oil flows from the passage A to the passage B, whereby the pressure of brake pressure port $P_B$ increases. When the pressure intensifying solenoid valve is off and the pressure reducing solenoid valve is on, the passages B and C communicate with each other so that the pressure oil flows to the return pressure port $P_R$ from the passage B through the passage C, thereby reducing the pressure in the brake pressure port $P_B$.

Accordingly, the pressure sensor detects the pressure of the brake pressure port $P_B$ and uses the pressure as a feedback signal to turn on-off the pressure intensifying solenoid valve and pressure reducing solenoid valve, thereby enabling the pressure of the brake pressure port to be desirably controlled.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
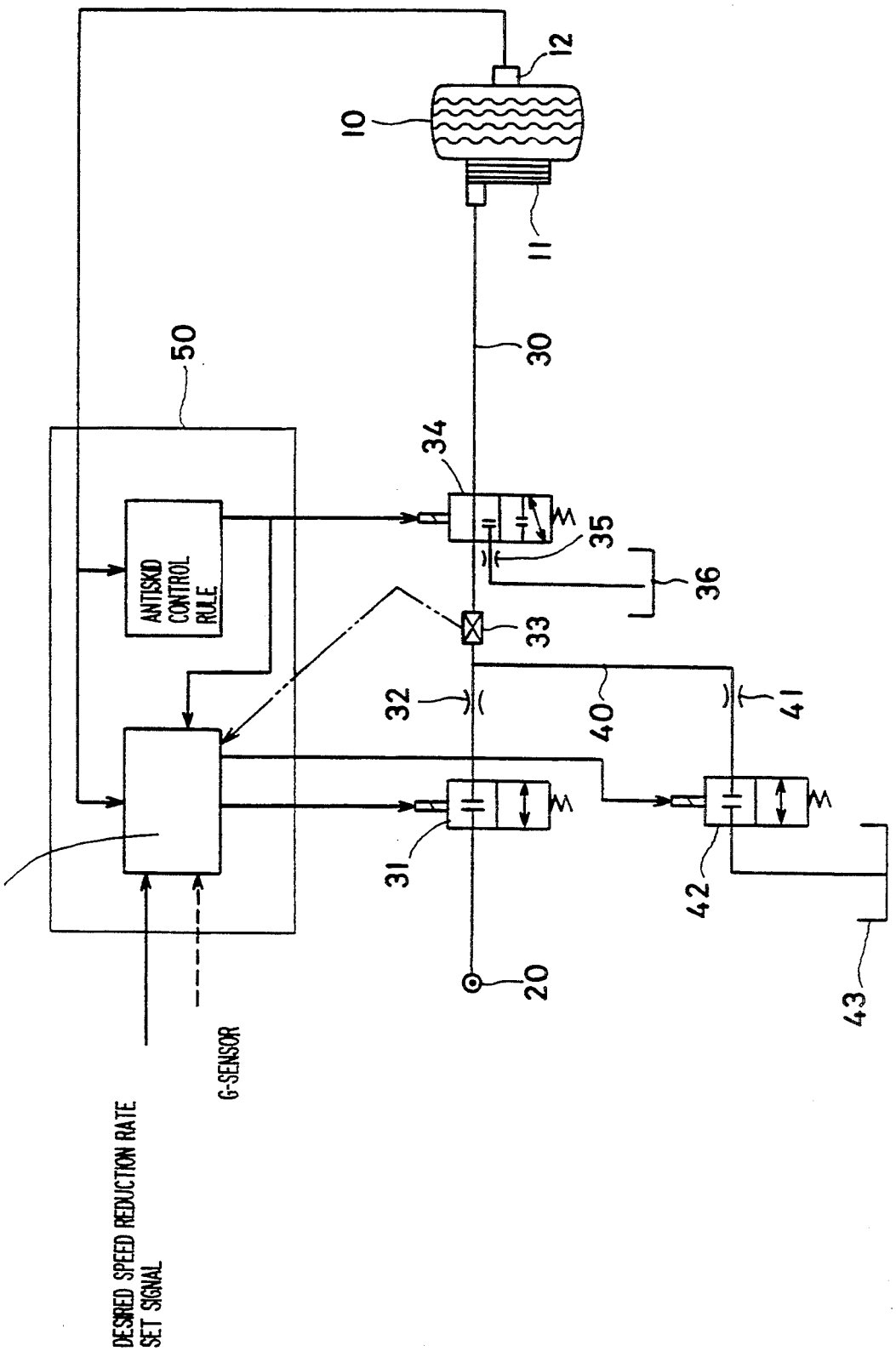
FIG. 1 is an electro-hydraulic system diagram of a structural example of the automatic brake control apparatus of the present invention.

Next, explanation will be given of an embodiment of the present invention on the basis of the drawings. FIG. 1 is an electro-hydraulic system diagram of an embodiment of an automatic brake control apparatus of the present invention.

In FIG. 1, a brake 11 for applying a control force to a wheel 10 and an oil pressure source 20 are connected to each other by a brake line 30. In the brake line 30 are interposed a pressure intensifying solenoid valve 31, a restrictor 32, a pressure sensor 33 and an antiskid solenoid valve 34, in order of disposition from the oil pressure source 20 to the brake 11.

The pressure intensifying solenoid valve 31 serves as an on-off valve for opening/closing an oil passage and is turned on when given instruction from the controller 50. The antiskid solenoid valve 34 is a directional control valve for switching the direction of oil passage, which, when given the instruction from the controller 50, relieves pressure oil in the brake line 30 to an oil tank 36 through a restrictor 35.

A relief line 40 branches from the brake line 30 between the restrictor 32 and the pressure sensor 33, and a restrictor 41 and a pressure reducing solenoid valve 42 are interposed in the relief line 40. The pressure reducing solenoid valve 42 is an on-off valve like the pressure intensifying solenoid valve 31 and relieves to a tank 43 the pressure oil in the brake line 30.

The controller 50 for controlling the pressure intensifying solenoid valve 31, pressure reducing solenoid valve 42 and antiskid solenoid valve 34 receives an output signal from the pressure sensor 33 and also from a rotation number sensor 12 provided at a wheel 10, and also from a setting device (not shown), a stored speed reduction rate selecting signal corresponding to the condition of a road surface. The controller 50 then performs the following computation and control on the basis of these input signals.

An actual speed reduction rate is computed on the basis of the output signal of the rotation number sensor 12, for example based on a rate of change of the output signal of sensor 12 over time. The desired brake pressure for which the computed actual speed reduction rate coincides with a stored desired speed reduction rate selected by the speed reduction rate selection signal, is obtained in accordance with the automatic control rules. For example, there may be stored maps of brake pressures for providing given speed reduction rates. The pressure intensifying solenoid valve 31 and pressure reduction solenoid valve 42 are then given control signals so that the actual pressure detected by the pressure sensor 31 may coincide with the desired brake pressure. In other words, when the actual pressure is less than the desired brake pressure, the pressure intensifying solenoid valve 31 is actuated, and, when the actual pressure is too high, the pressure reducing solenoid valve 42 is actuated.

Also, if the skid of wheel 10 is sensed on the basis of the output signal of the rotation number sensor 12, a control signal is outputted to the antiskid solenoid valve 34 for reducing the skid. For this purpose, a usual antiskid control rule is used.

Figure 2:
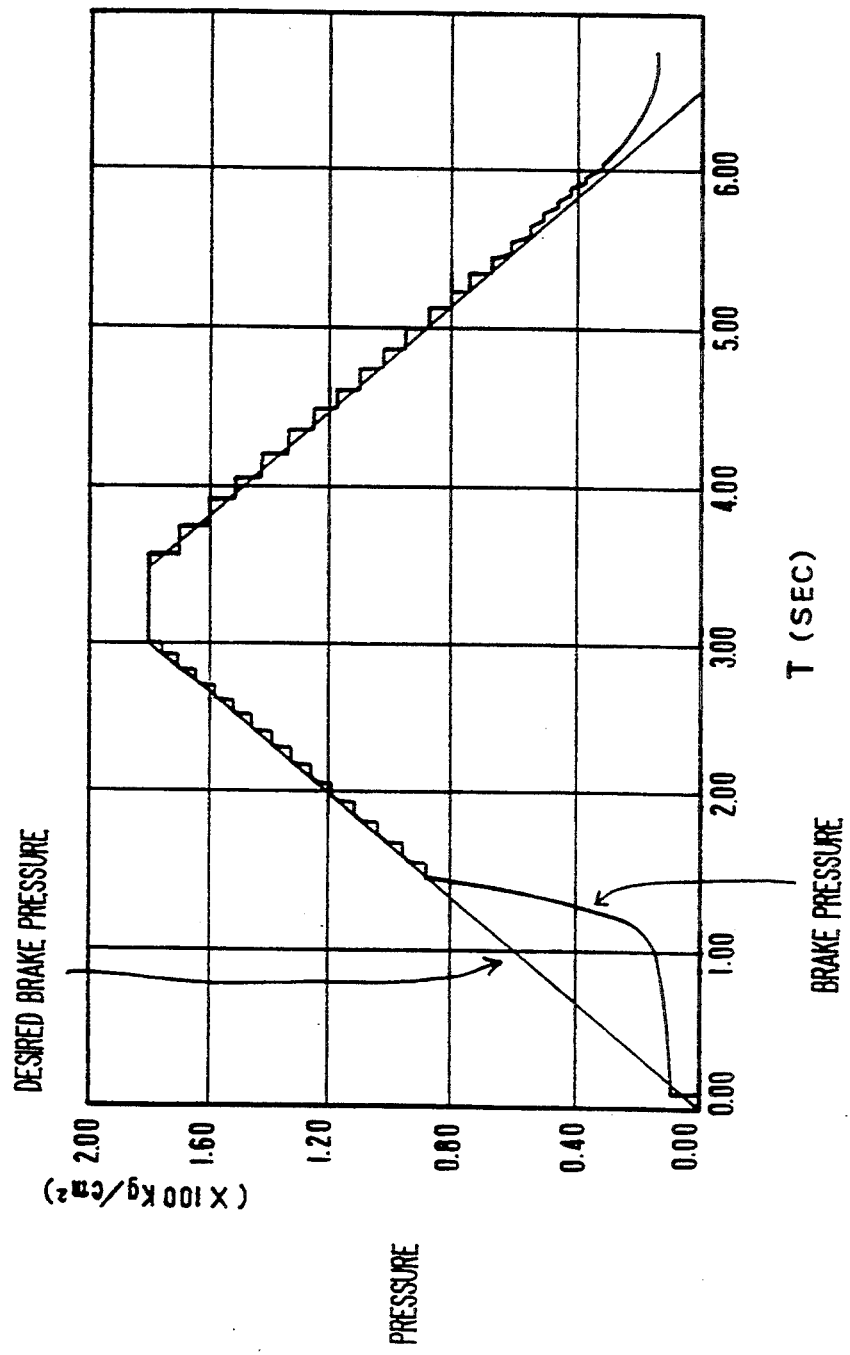
FIG. 2 shows a pattern of brake pressure control explanatory of the operation of the automatic brake control apparatus.

FIG. 2 is a time chart showing an example of controlling the brake pressure by the above-mentioned control apparatus, in which a desired brake pressure computed by the controller 50 rises at constant speed in proportion to the lapse of time from starting of operation and thereafter falls at constant speed.

Simultaneously with the start of operation of the automatic brake, the pressure intensifying solenoid valve 31 is changed over from off to on, whereby the pressure oil in the oil pressure source 20 is sent to the brake 11 through the brake line 30. At the beginning of operation the brake pressure does not abruptly increase, because a certain amount of operating oil must fed to the brake cylinder in order to put the brake caliper in contact with the brake disc. When the brake disc is engaged by the caliper, the brake pressure abruptly increases. When the brake pressure exceeds the desired brake pressure, the pressure intensifying solenoid valve 31 returns to the off state. When the desired brake pressure increases to again exceed the brake pressure, the pressure intensifying solenoid valve 31 returns to on, which is repeated to continue pressure control until the desired brake pressure reaches the maximum value.

When the desired brake pressure starts to fall and the brake pressure is above the desired brake pressure, the pressure reducing solenoid valve 42 is changed over from the off state to the on state, whereby the brake pressure abruptly falls. When the brake pressure coincides with the desired brake pressure, the pressure reducing solenoid valve 42 returns to off, which is repeated to allow the brake pressure fall at the desired rate.

When the skid of wheel is sensed during the braking action, the antiskid solenoid valve 34 operates, whereby the brake pressure is released little by little to check the skid. In addition, when the pressure intensifying solenoid vale 31 and pressure reducing solenoid valve 42 operate, the pressure is sensed by the pressure sensing unit, whereby the controller 50 functioned to stop the operation of solenoid valves 31 and 42.

In the automatic brake control apparatus in FIG. 1, conduit resistance of the restrictor 41 or the like provided at the relief line 40 is optimized so as to make possible automatic brake control compatible with the electro-hydraulic servovalve. Also, since solenoid valves are used, the control apparatus is inexpensive to produce, resistant to contamination and magnetic fields, has reduced oil consumption, does not need a pump as an oil pressure source, can be used with an accumulator, and can be used in an emergency.

Figure 3:
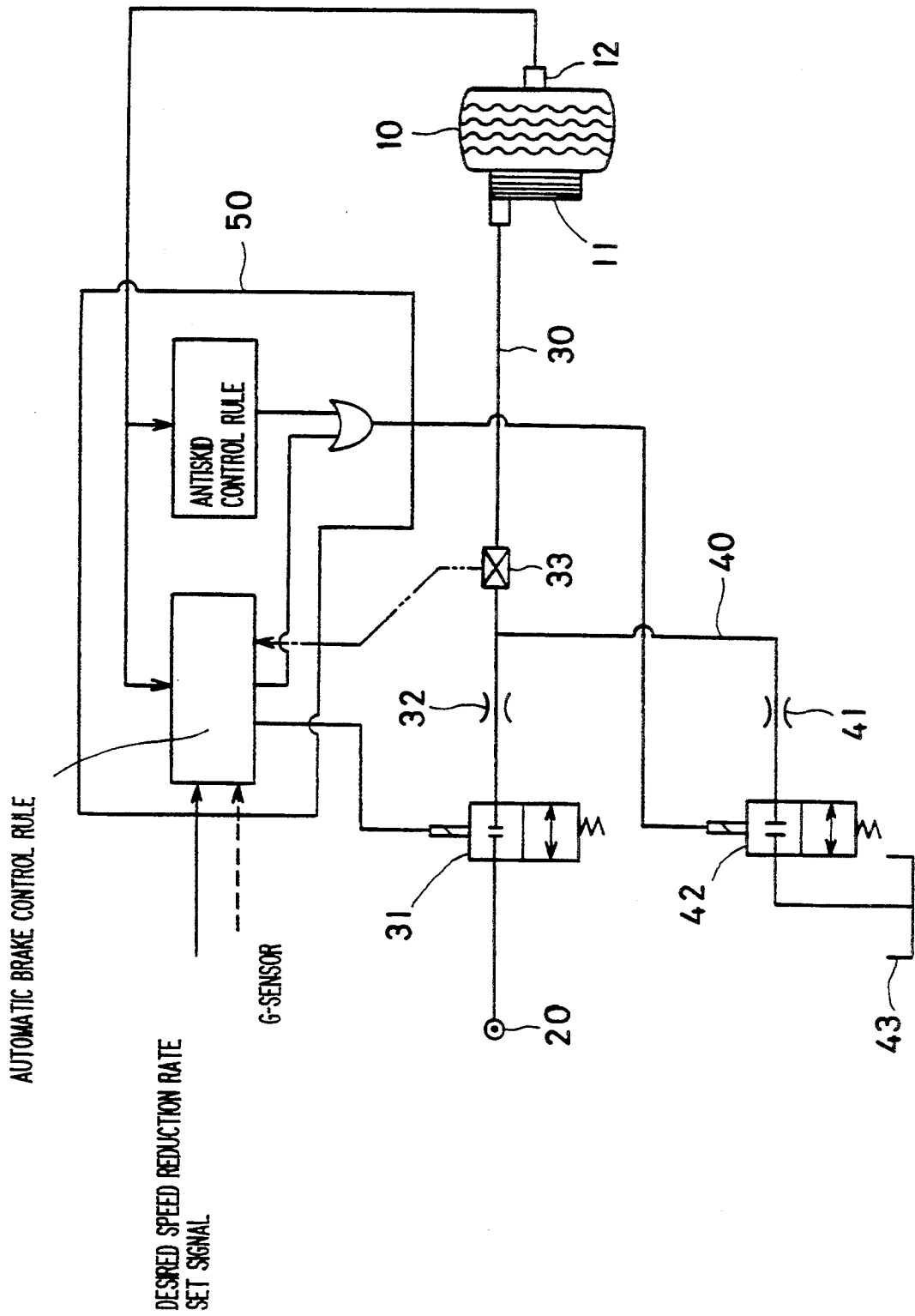
FIG. 3 is an electro-hydraulic system diagram of another structural example of the automatic brake control apparatus of the invention.
Figure 4:
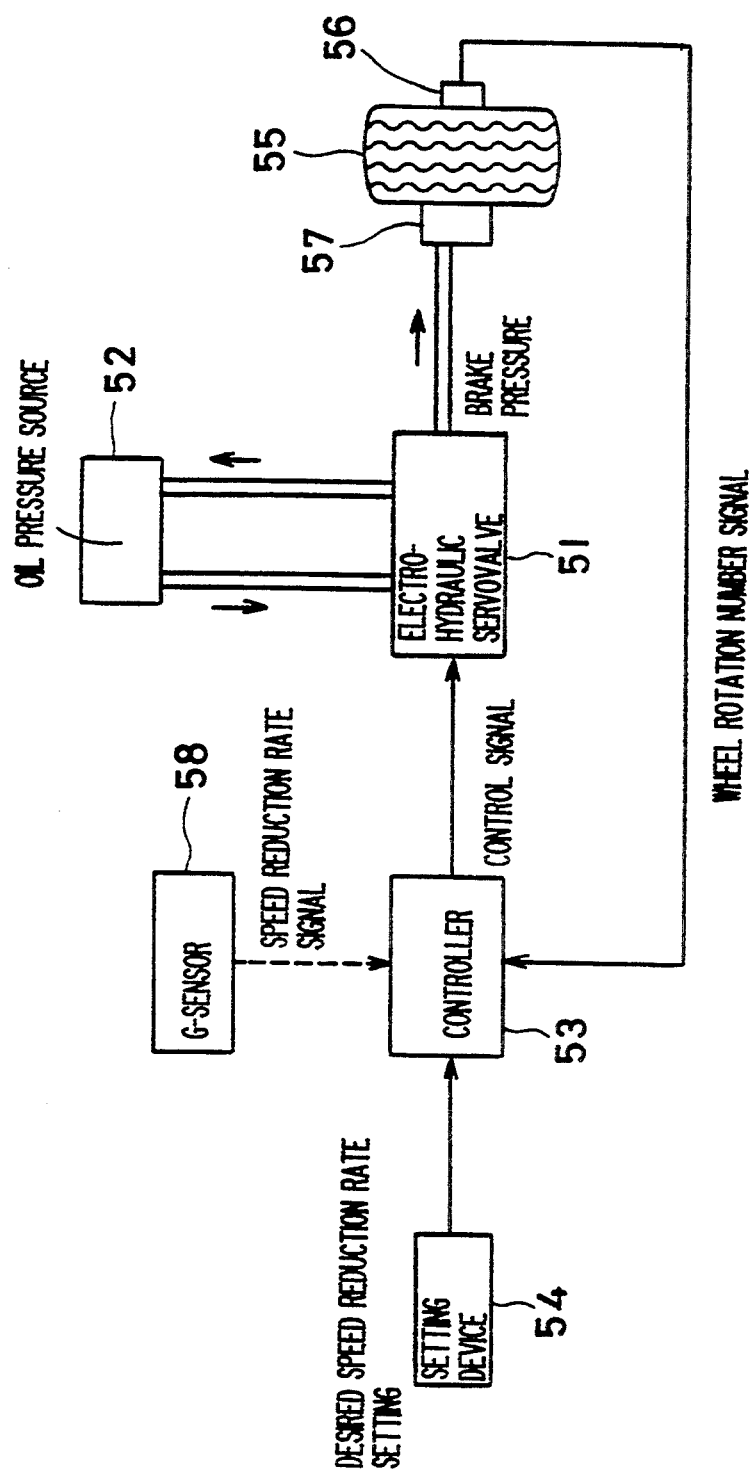
FIG. 4 is an electro-hydraulic system diagram of the structure of the conventional automatic brake control apparatus.

Although in the above-mentioned embodiment the solenoid valve 34 is provided for antiskid, as shown in FIG. 3, the pressure reducing solenoid valve 42 may be constructed to also be used as the antiskid solenoid valve. Also, the pressure intensifying solenoid valve 31 and pressure reducing solenoid valve 42 may be integral. Furthermore, these solenoid valves 31 and 42 may be integral with the antiskid solenoid valve 34. However, When a plurality of wheels are individually antiskid controlled, each antiskid solenoid valve 34 may independently be mounted. Also, a signal of a G-sensor (i.e., acceleration/deceleration sensor) may be used instead of or in addition to the signal of the rotation number sensor 12.

The automatic brake control apparatus of the present invention is usable for normal and emergency automatic brake system at airplanes, railway vehicles, automobiles and magnetic levitation vehicles, and also for normal and emergency automatic speed reduction stop apparatuses in other general industrial equipment.

Figure 5:
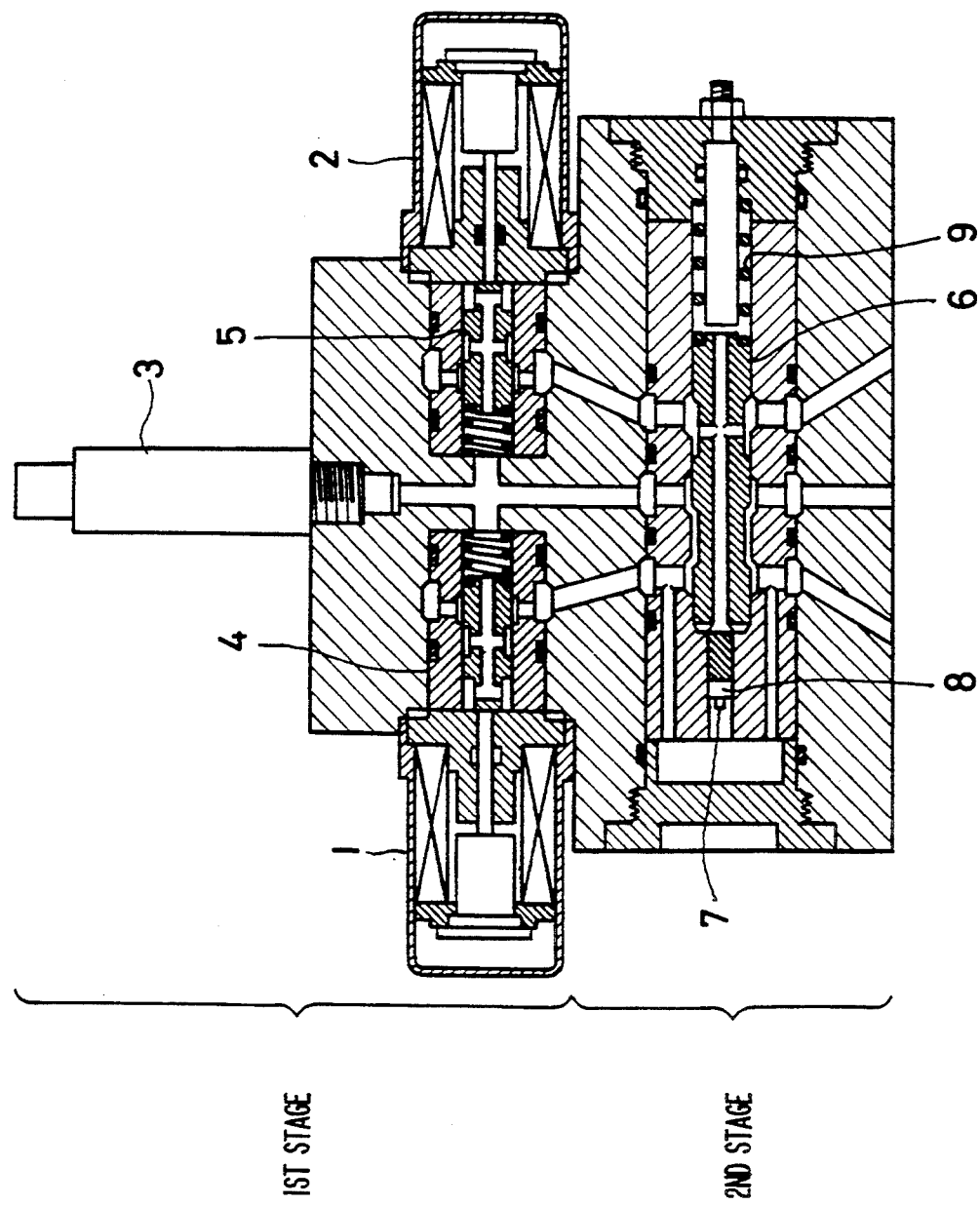
FIG. 5 is a sectional view of a structural example of the brake pressure control valve of the present invention.

FIG. 5 is a sectional view of an example of the brake pressure control valve of the present invention, which provides the functions of the aforedescribed automatic brake control apparatus. The control valve comprises a first stage and a second stage.

The first stage is provided with a pressure intensifying solenoid valve 1 for opening/closing, via a spool 4, communication between a passage A communicating with a control pressure feed port $P_S$ leading from a source of hydraulic oil under pressure and a passage B communicating with a brake pressure port $P_B$ leading to a hydraulic brake. A pressure reducing solenoid valve 2 opens/closes, via a spool 5, communication between the passage B and a passage C communicating with a return pressure port $P_R$ leading to a low pressure reservoir. A pressure sensor 3 is at one end of passage B.

The second stage is provided with a spool 6 which is interposed in each passage A, B or C for opening/closing each such passage. One end face of the spool 6 is disposed to face a chamber 8 communicating via an orifice 7 with a passage D branching from the passage A. The other end face is biased by a coil spring 9.

In the state where the spool 6 is biased by the coil spring 9 so as to abut against the chamber 8, the control pressure feed port $P_S$ communicates with the brake pressure port $B_B$. But when the spool 6 moves rightwardly against a spring force of the coil spring 9, the control pressure feed port Ps and brake pressure port $P_B$ are cut off therebetween, so as to close the passage B communicating with the brake port $P_B$.

Next, explanation will be given on the operation of brake pressure control. In the illustrated state where the pressure intensifying solenoid valve 1 and pressure reducing solenoid valve 2 are closed, high pressure oil fed from the control pressure feed port $P_S$ reaches the passage A. The high pressure oil also initially flows through the passage B to the brake pressure Port $P_B$ through the spool 6. However, the high pressure oil is simultaneously fed to the passage D and flows into the chamber 8 via the orifice 7 to thereby raise the pressure in the chamber 8. As the pressure therein rises, the spool 6 is moved against the spring force of coil spring 9 and the spool 6 cuts off communication between the passage A and the passage B. In this state, the pressure in the brake pressure port $P_B$ is kept constant.

In this state, when the pressure intensifying solenoid valve 1 is actuated to move the spool 4 to communicate the passage A with passage 8, the high pressure oil flows from the passage A to that B via the spool 4, so that the pressure at the brake pressure port $P_S$ rises.

Also, in the state where the pressure intensifying solenoid valve 1 is closed, when the pressure reducing solenoid valve 2 is actuated to move the spool 5 to communicate the passage B with passage C, the high pressure oil in the passage B is sent to a reservoir (not shown) from the passage C through the return pressure port $P_R$, thereby reducing the pressure in the brake pressure port $P_B$.

Thus, the pressure at the brake pressure port $P_B$ is controlled by turning on-off the pressure intensifying solenoid valve 1 and pressure reducing solenoid valve 2. Accordingly, when the pressure sensor 3 detects the pressure of brake pressure port $P_B$ and the detected pressure is used as a feedback signal, the pressure of brake pressure port $P_B$ is controlled to the desired value.

This control valve can be used in, for example, the above-mentioned automatic brake apparatus, in which the pressure intensifying solenoid valve 1 corresponds to the pressure intensifying solenoid valve 31, the pressure reducing solenoid valve 2 to the pressure reducing solenoid valve 42, the pressure sensor 3 to the pressure sensor 33, and the spool 6 to the spool of the antiskid solenoid valve 34. Also, the control valve can be used not only for the automatic brake control apparatus but also for an ABS control apparatus for automobiles.

As seen from the above, the automatic brake control apparatus of the present invention has braking performance equivalent to the conventional apparatus using a servovalve, and is advantageous in the following points: the apparatus is inexpensive to produce, is highly insensitive to magnetism and contamination, and has reduced oil consumption. In order to feed back the brake pressure, brake control free from hysteresis is possible. Less oil consumption makes it possible to use a small-sized accumulator as the oil pressure source to result in reasonable construction as an emergency brake apparatus. Also the control apparatus of the invention, which is not sensitive to magnetic fields, is usable in the environment of a ferromagnetic field such as in a linear motor.

The brake pressure control valve of the present invention, which integrates three valves required for controlling the brake pressure, is small-sized. The control valve has no microdrive unit, such as a nozzle flapper, for a servovalve and so is superior in contamination resistance. Also, the control valve of the invention takes-in or discharges only the necessary operating oil even during the brake pressure control, thereby enabling the oil consumption to be reduced, and can feed via the second stage the operating oil for moving the brake actuator a minute amount by on-off control of the solenoid valve, thereby enabling highly responsive pressure control to be performed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An automatic brake control apparatus, comprising:
   a hydraulic brake line connecting a source of hydraulic pressure with a brake;
   a pressure intensifying solenoid valve in said brake line and operative to selectively open said brake line;
   a relief line branched from said brake line and connected to a low pressure reservoir;
   a pressure reducing solenoid valve in said relief line and operative to selectively drain hydraulic fluid from said brake line to the reservoir;
   a pressure sensor positioned to sense a hydraulic pressure in said brake line at a position downstream of a point where said relief line branches from said brake line;
   a controller receiving a signal from said pressure sensor and including means for determining desired brake pressure for producing a desired speed reduction rate, and means for outputting control signals to said pressure intensifying solenoid valve and said pressure reducing solenoid valve such that a detected brake pressure corresponds to said desired brake pressure.

2. The apparatus of claim 1 including an antiskid control valve in said brake line downstream of said pressure sensor, and antiskid control means receiving signals from said pressure sensor and operative for controlling said antiskid control valve so as to reduce skidding.

3. The apparatus of claim 1 including antiskid control means receiving signals from said pressure sensor and controlling said pressure reducing solenoid valve so as to reduce skidding.

4. The automatic brake control of claim 1, further comprising:
   a valve body having a control pressure feed port $P_S$ connected to said source of hydraulic pressure, a brake pressure port $P_B$ connected to said brake, and a return pressure port $P_r$ connected to said low pressure reservoir;
   a passage B in said valve body leading to said port $P_B$;
   a passage A in said valve body and leading to said port $P_S$;
   a passage C in said valve body and leading to said port $P_r$;
   wherein said pressure intensifying solenoid valve is in said valve body and has a spool movable to selectively connect said passage A with said passage B;
   and wherein said pressure reducing solenoid valve is in said valve body and has a spool movable to selectively connect said passage C with said passage B, said pressure intensifying and reducing valves forming a first stage; and
   a second stage in said valve body and comprising:
   a) a second stage spool intersecting said passages A, B and C,
   b) a coil spring biasing one end of said second stage spool,
   c) a chamber facing the other end of said second stage spool,
   d) a passage D including an orifice and communicating said passage A with said chamber.

5. The apparatus of claim 4 wherein said pressure sensor is connected to said passage B.

* * * * *